United States Patent
Suzuki et al.

(10) Patent No.: US 10,643,794 B2
(45) Date of Patent: May 5, 2020

(54) CAPACITOR AND PROCESS FOR PRODUCING THEREOF

(71) Applicants: Murata Manufacturing Co., Ltd., Nagaokakyo-shi, Kyoto-fu (JP); Leibniz Institute for Solid State and Materials Research Dresden, Dresden (DE)

(72) Inventors: Shoichiro Suzuki, Nagaokakyo (JP); Akira Ando, Nagaokakyo (JP); Koichi Banno, Nagaokakyo (JP); Oliver G Schmidt, Dresden (DE); Daniel Grimm, Dresden (DE)

(73) Assignees: MURATA MANUFACTURING CO., LTD., Nagaokakyo-Shi, Kyoto-Fu (JP); LEIBNIZ INSTITUTE FOR SOLID STATE AND MATERIALS RESEARCH DRESDEN, Dresden (DE)

( * ) Notice: Subject to any disclaimer, the term of this patent is extended or adjusted under 35 U.S.C. 154(b) by 0 days.

(21) Appl. No.: 15/440,504

(22) Filed: Feb. 23, 2017

(65) Prior Publication Data
US 2017/0162333 A1 Jun. 8, 2017

Related U.S. Application Data

(63) Continuation of application No. PCT/JP2014/072851, filed on Aug. 26, 2014.

(51) Int. Cl.
*H01G 4/32* (2006.01)
*H01G 4/232* (2006.01)
(Continued)

(52) U.S. Cl.
CPC ............ *H01G 4/32* (2013.01); *H01G 4/015* (2013.01); *H01G 4/1218* (2013.01); *H01G 4/232* (2013.01); *H01G 4/1236* (2013.01)

(58) Field of Classification Search
CPC ............ H01G 4/32; H01G 4/232; H01G 9/00; H01G 4/1218; H01G 4/015
(Continued)

(56) References Cited

U.S. PATENT DOCUMENTS 3,654,523 A * 4/1972 Markarian ............. H01G 9/022
 252/62.2
5,160,653 A * 11/1992 Clouse ................... H01G 9/022
 252/62.2
(Continued)

FOREIGN PATENT DOCUMENTS

CN 102446627 A 5/2012
CN 202258811 U 5/2012
(Continued)

OTHER PUBLICATIONS

International Search Report issued in International Patent Application No. PCT/JP2014/072851, dated May 19, 2015.
(Continued)

*Primary Examiner* — Arun Ramaswamy
(74) *Attorney, Agent, or Firm* — Arent Fox LLP

(57) ABSTRACT

A roll-up type capacitor includes a cylindrical part, a first external electrode, and a second external electrode. The cylindrical part is a rolled-up laminate in which a lower electrode layer, a dielectric layer and an upper electrode layer are laminated in this order. The first external electrode is electrically connected to the upper electrode layer, and the second external electrode is electrically connected to the lower electrode layer, and the first external electrode and the second external electrode are respectively located on opposed sides of the cylindrical part such that they face to each other.

5 Claims, 5 Drawing Sheets

(51) Int. Cl.
*H01G 4/12* (2006.01)
*H01G 4/015* (2006.01)

(58) Field of Classification Search
USPC .............. 361/502, 511, 530, 301.5, 303, 305
See application file for complete search history.

(56) References Cited

U.S. PATENT DOCUMENTS

| | | | |
|---|---|---|---|
| 2002/0034062 A1* | 3/2002 | O'Phelan | H01G 9/008 361/511 |
| 2005/0118733 A1 | 6/2005 | Schmidt et al. | |
| 2005/0263845 A1* | 12/2005 | Saito | H01G 2/10 257/516 |
| 2009/0046414 A1 | 2/2009 | Schmidt | |
| 2011/0163421 A1 | 7/2011 | Mi | |
| 2014/0103486 A1 | 4/2014 | Li et al. | |
| 2014/0226259 A1 | 8/2014 | Hosking et al. | |
| 2014/0234977 A1 | 8/2014 | Grimm et al. | |

FOREIGN PATENT DOCUMENTS

| | | | | |
|---|---|---|---|---|
| EP | 2023357 | A1 | 2/2009 | |
| EP | 2136380 | A2 | 12/2009 | |
| EP | 2304818 | A2 | 4/2011 | |
| GB | 844707 | A | 8/1960 | |
| JP | H3-106722 | U | 11/1991 | |
| WO | WO 2010/007110 | A2 | 1/2010 | |
| WO | WO-2013073110 | A1 * | 5/2013 | ............ H01G 4/32 |

OTHER PUBLICATIONS

Written Opinion of the International Searching Authority issued for International Patent Application No. PCT/JP2014/072851, dated May 19, 2015.
Japanese Office Action dated Mar. 20, 2018 and issued for JP 2017-510914.
Chinese Office Action issued for Chinese Application No. 201480081458.2, dated Jan. 29, 2018.
Chinese Office Action dated Oct. 18, 2018 and issued for Chinese Application No. 201480081458.2.
Communication pursuant to Article 94(3) EPC received in corresponding EP Application 14 762 106.4, dated Dec. 19, 2018.

* cited by examiner (g)

(h-1)

(h-2)

(i-1)

(i-2)

(j-1)

(j-2)

(k-1)

(k-2)

(l)

(m)

CAPACITOR AND PROCESS FOR PRODUCING THEREOF

CROSS REFERENCE TO RELATED APPLICATIONS

The present application is a continuation of International application No. PCT/JP2014/072851, filed Aug. 26, 2014, the entire contents of which are incorporated herein by reference.

FIELD OF THE INVENTION

The present invention relates to a capacitor and a process for producing thereof.

BACKGROUND OF THE INVENTION

Recently, a capacitor which has a higher capacitance and a smaller size is required in association with a high-density packaging of an electronic apparatus. As such capacitor, for example, Patent Literature 1 discloses a roll-up type capacitor wherein a laminate in which a first electrically insulating layer, a first electrically conducting layer, a second electrically insulating layer, and a second electrically conducting layer are laminated is rolled-up, and electrode terminals are connected to the end portions of the rolled-up first electrically conducting layer and second electrically conducting layer.

Such a roll-up type capacitor is produced as follows. A sacrificial layer is first formed on a substrate, and the first electrically insulating layer, the first electrically conducting layer, the second electrically insulating layer, and the second electrically conducting layer are laminated thereon to obtain the laminate. An etching solution is fed from a side of the laminate from which the rolling-up is started, thereby gradually removing the sacrificial layer. By the removal of the sacrificial layer, the laminate peels from the substance and rolls-up. Finally, electrode terminals are connected to the end portions of the first electrically conducting layer and the second electrically conducting layer which are rolled-up to produce the roll-up type capacitor disclosed in Patent Literature 1.

Patent Literature 1: EP 2 023 357 A1

SUMMARY OF THE INVENTION

In the roll-up type capacitor as described in Reference 1, the electrode terminals for connecting to an external electrical element are formed on the end portions of the rolled-up first electrically conducting layer and second electrically conducting layer (hereinafter, collectively referred to as an "electrically conductive layer"). It has been found that the problem that an ESR (Equivalent Series Resistance) becomes higher arises because the connecting area between the electrically conducting layer and the electrode terminal cannot be increased. This is because the resistance is high due to a small area of the connection between the electrically conducting layer and the electrode terminal. Additionally, it has been found that the roll-up type capacitor as described in Reference 1 is not suitable for use in a high frequency range because a current spirally flows in the cylindrical part.

An object of the present invention is to provide a roll-up type capacitor which has a low ESR and can be suitably used in a high frequency range and a process for producing the roll-up type capacitor.

The present inventors have carried out extensive studies to solve the problem and found that by providing a pair of outer electrodes to both ends of the cylindrical part which is obtained by the rolling-up of a laminate comprising a lower electrode layer, a dielectric layer and an upper electrode layer, i.e. by providing one outer electrode to one end of the cylindrical part such that the outer electrode is electrically connected to the lower electrode layer and providing the other electrode to the other end of the cylindrical part such that the outer electrode is electrically connected to the upper electrode layer, the roll-up type capacitor having a low ESR and can be suitably used in a high frequency range can be produced.

In the first aspect, the present invention provides a roll-up type capacitor which comprises a cylindrical part, a first external electrode, and a second external electrode. The cylindrical part is obtained by the rolling-up of a laminate in which a lower electrode layer, a dielectric layer and an upper electrode layer are laminated in this order. The first external electrode is electrically connected to the upper electrode layer, and the second external electrode is electrically connected to the lower electrode layer, and the first external electrode and the second external electrode are respectively located on each of the both sides of the cylindrical part such that they face to each other.

In the second aspect, the present invention provides a process for producing the roll-up type capacitor described above. The process includes forming a sacrificial layer on a substrate; forming a lower electrode layer, a dielectric layer and an upper electrode layer on the sacrificial layer in this order to obtain a laminate; rolling-up the laminate by removing the sacrificial layer to obtain a cylindrical part; and forming a first external electrode on one side of the obtained cylindrical part such that the first external electrode is electrically connected to the upper electrode layer, and forming a second external electrode on the other side such that the second external electrode is electrically connected to the lower electrode layer.

According to the present invention, the roll-up type capacitor having a low ESR and can be suitably used in a high frequency range is provided by the formation of a pair of outer electrodes on the both ends of the cylindrical part which is obtained by the rolling-up of the laminate.

DETAILED DESCRIPTION OF PREFERRED EMBODIMENTS OF THE INVENTION

The roll-up type capacitor of one embodiment of the present invention and the process for producing thereof will be explained below with reference to the accompanied drawings. It is noted that the shape and configuration of the roll-up type capacitor in this embodiment is not limited to the illustrated examples.

Figure 1:
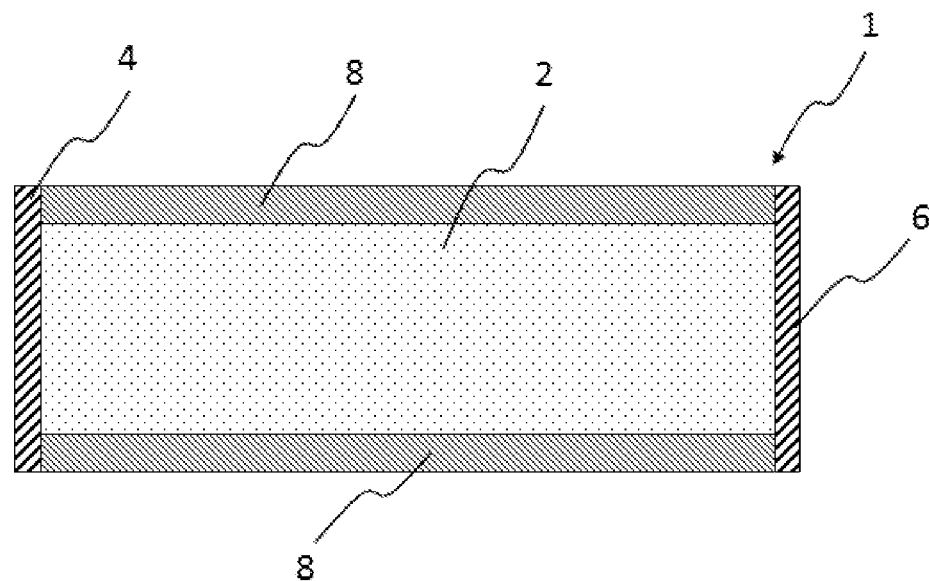
FIG. 1 schematically shows a roll-up type capacitor in one embodiment of the present invention in its cross-sectional view along the central axis of the cylindrical part.

As schematically shown in FIG. 1, a capacitor 1 in this embodiment comprises a cylindrical part 2, a first external electrode 4, a second external electrode 6 and a resin part 8 wherein the first external electrode 4 and the second external electrode 6 are positioned at both ends of the cylindrical part 2 so as to be opposed to each other, and the other section of the cylindrical part 2 is covered with the resin part 8. The cylindrical part 2 is obtained by the rolling-up of the laminate 10 shown in FIG. 2. It is noted that the "end" of the cylindrical part means the end (or surface) which intersects with the central axis of the cylindrical part. In the laminate 10, a lower electrode layer 12, a dielectric layer 14, an upper electrode layer 16 and an insulating layer 18 are laminated in this order. As illustrated, in the laminate 10, the lower electrode layer 12 and the upper electrode layer 16 are disposed such that one end of the electrode layer does not overlap the other electrode layer. The laminate 10 is rolled-up to form the cylindrical part 2, and the first external electrode 4 and the second external electrode 6 are disposed at the positions corresponding to the left and right side in FIG. 2, respectively. Therefore, the upper electrode layer 16 is electrically connected to the first external electrode 4 and is electrically separated from the second external electrode 6. Similarly, the lower electrode layer 12 is electrically connected to the second external electrode 6 and is electrically separated from the first external electrode 4.

The roll-up type capacitor of the present invention can be miniaturized. For example, the inner diameter may be 50 pm or less, preferably 20 pm or less.

A material forming the lower electrode layer is not particular limited as long as it is electrically conductive. Examples of the material include Ni, Cu, Al, W, Ti, Ag, Au, Pt, Zn, Sn, Pb, Fe, Cr, Mo, Ru, Pd, Ta and an alloy thereof, for example, CuNi, AuNi, AuSn and a metal oxide and a metal oxynitride such as TiN, TiAlN, TION, TiAlON, TaN, and the like. Preferably, Pt is used.

A thickness of the lower electrode layer is not particularly limited, but is, for example, preferably 10-50 nm. By more increasing the thickness of the lower electrode layer, for example by regulating the thickness to 50 nm, the ESR can be more reduced. By more reducing the thickness of the lower electrode layer, for example by regulating the thickness to 10 nm, a diameter of the roll can be more reduced, therefore the size of the capacitor can be more reduced.

A process for forming the lower electrode layer is not particular limited, and the lower electrode layer may be directly formed on the substrate or an underlayer if present or it may be formed by the application of a membrane which is separately formed to the substrate or the underlayer. Examples of the method for directly forming the lower electrode layer on the substrate or the underlayer include a vacuum deposition method, a chemical vapor deposition method, a sputtering method, an ALD (Atomic Layer Deposition) method, a PLD (Pulsed Laser Deposition) method, and the like.

A material forming the dielectric layer is not particular limited as long as it is electrically insulating. For example, it may be a metal oxide such as a perovskite type complex oxide, aluminum oxide ($AlO_x$: for example, $Al_2O_3$), silicon oxide ($SiO_x$: for example, $SiO_2$), Al—Ti complex oxide ($AlTiO_x$), Si—Ti complex oxide ($SiTiO_x$), hafnium oxide ($HfO_x$), tantalum oxide ($TaO_x$), zirconium oxide ($ZrO_x$), Hf—Si complex oxide ($HfSiO_x$), Zr—Si complex oxide ($ZrSiO_x$), Ti—Zr complex oxide ($TiZrO_x$), Ti—Zr—W complex oxide ($TiZrWO_x$), titanium oxide ($TiO_x$), Sr—Ti complex oxide ($SrTiO_x$), Pb—Ti complex oxide ($PbTiO_x$), Ba—Ti complex oxide ($BaTiO_x$), Ba—Sr—Ti complex oxide ($BaSrTiO_x$), Ba—Ca—Ti complex oxide ($BaCaTiO_x$), Si—Al complex oxide ($SiAlO_x$); metal nitride such as aluminum nitride ($AlN_y$), silicon nitride ($SiN_y$), Al—Sc complex nitride ($AlScN_y$), and the like; or a metal oxynitride such as aluminum oxynitride ($AlO_xN_y$), silicone oxynitride ($SiO_xN_y$), Hf—Si complex oxynitride ($HfSiO_xN_y$), Si—C complex oxynitride ($SiC_zO_xN_y$) and the like. It is noted that the above formulae are only intended to show a constitution of the atoms and does not limit the composition. In other words, x, y and z which accompany O, N and C, respectively, may be arbitrary values, and a present ratio of the atoms comprising the metal atoms is arbitrary. In order to obtain a higher capacitance, a material having a higher permittivity is preferable. Examples of the material having a high permittivity include the perovskite type complex oxide of the formula $ABO_3$ (wherein A and B are an arbitrary metal atom), and preferably is the perovskite type complex oxide containing titanium (Ti) (hereinafter, referred to as a "titanium (Ti)-perovskite type complex oxide"). Examples of the preferable Ti-perovskite type complex oxide include $BaTiO_3$, $SrTiO_3$, $CaTiO_3$, $(BaSr)TiO_3$, $(BaCa)TiO_3$, $(SrCa)TiO_3$, $Ba(TiZr)O_3$, $Sr(TiZr)O_3$, $Ca(TiZr)O_3$, $(BaSr)(TiZr)O_3$, $(BaCa)(TiZr)O_3$, $(SrCa)(TiZr)O_3$. Since the Ti-perovskite type complex oxide has a high specific permittivity, it has an advantage in that the capacitance of the capacitor can be increased.

A thickness of the dielectric layer is not particular limited, but is, for example, preferable 10-100 nm, more preferably 10-50 nm. By regulating the thickness of the dielectric layer to 10 nm or more, the insulation property can be increased, therefore a leakage current can be reduced. By regulating the thickness of the dielectric layer to 100 nm or less, a diameter of the roll can be more reduced, therefore the size can be more reduced.

A process for forming the dielectric layer is not particular limited, and the dielectric layer may be directly formed on the lower electrode layer or it may be formed by the application of a membrane which is separately formed to the lower electrode layer. Examples of the method for directly forming the dielectric layer on the lower electrode layer include a vacuum deposition method, a chemical vapor deposition method, a sputtering method, an ALD method, a PLD method, and the like. When the material forming the dielectric layer is the perovskite type complex oxide, the dielectric layer is preferably formed by the sputtering method.

When the dielectric layer is formed by the sputtering method, it is preferable to perform the formation of the layer at the substrate temperature of 500-600° C. By the treatment at such high temperature, the crystallinity of the obtained dielectric layer is increased, therefore, higher specific permittivity can be obtained. When the treatment is performed at the high temperature, it is preferable that the laminate has a diffusion-preventing layer as described below.

A material forming the upper electrode layer is not particular limited as long as it is electrically conductive. Examples of the material forming the upper electrode layer include Ni, Cu, Al, W, Ti, Ag, Au, Pt, Zn, Sn, Pb, Fe, Cr, Mo, Ru, Pd, Ta and an alloy thereof, for example, CuNi, AuNi, AuSn, and a metal oxide and a metal oxynitride such as TiN, TiAlN, TION, TiAlON, TaN, and the like. Preferably, Cr is used.

A thickness of the upper electrode layer is not particular limited but is, for example, preferably 10-50 nm, more preferably 10-30 nm. By more increasing the thickness of the upper electrode layer, for example by regulating the thickness to 50 nm, the ESR can be more reduced. By more reducing the thickness of the upper electrode layer, for example by regulating the thickness to 30 nm or less, a diameter of the roll can be more reduced, therefore the size of the capacitor can be more reduced.

A process for forming the upper electrode layer is not particular limited, and the upper electrode layer may be directly formed on the dielectric layer or it may be formed by the application of a membrane which is separately formed to the dielectric layer. Examples of the method for directly forming the upper electrode layer on the dielectric layer include a vacuum deposition method, a chemical vapor deposition method, a sputtering method, an ALD method, a PLD method, and the like.

The insulating layer 18 is provided in order to prevent the lower electrode layer and the upper electrode layer from electrically connecting to each other, and the short therebetween that occurs when the laminate is rolled-up. Therefore, a material forming the insulating layer is not particular limited as long as it is electrically insulating. It preferably includes the same as the above described material forming the dielectric layer. The use of the material described as the material forming the dielectric layer increases a function of the insulating layer as a dielectric layer. Therefore, a capacitor having a higher capacitance can be obtained. It is noted that the insulating layer is not necessarily provided when there is no possibility of electrical contact between the lower electrode layer and the upper electrode layer.

A thickness of the insulating layer is not particular limited as long as the insulation between the lower electrode layer and the upper electrode layer is ensured, but is, for example, preferable 10-100 nm, more preferably 10-50 nm. By regulating the thickness of the insulating layer to 10 nm or more, the insulation property can be increased, therefore a leakage current can be reduced. By regulating the thickness of the insulating layer to 100 nm or less, a diameter of the roll can be more reduced, therefore the size can be more reduced.

A process for forming the insulating layer is not particular limited, and the insulating layer may be directly formed on the upper electrode layer or it may be formed by the application of a membrane which is separately formed to the upper electrode layer. Examples of the method for directly forming the insulating layer on the upper electrode layer include a vacuum deposition method, a chemical vapor deposition method, a sputtering method, an ALD method, a PLD method, and the like. When the material forming the insulating layer is the perovskite type complex oxide, the insulating layer is preferably formed by the sputtering method.

A material forming the first external electrode and the second external electrode is not particular limited as long as it is electrically conductive, but includes Ag, Cu, Pt, Ni, Al, Pd and Au, and an alloy thereof such as a monel (Ni—Cu alloy).

A process for forming the first external electrode and the second external electrode is not particular limited, but includes, for example, a plating method, a vapor deposition method, a sputtering method, and the like.

The resin part is provided in order to protect the cylindrical part and increase ease of handling. A resin forming the resin part may penetrate into the inside of the cylindrical part. By the penetration of the resin into the inside of the cylindrical part, the cylindrical part is hardened with the resin and the property of the capacitor becomes more stable. It is noted that the resin part is not essential, and even if it is absent the capacitor of the present invention can function.

A material forming the resin part is not particular limited as long as it is electrically insulating, but includes an acrylic resin, epoxy, polyester, silicone, polyurethane, polyethylene, polypropylene, polystyrene, nylon, polycarbonate, polybutylene terephthalate resin and the like. Additionally, the material may contain an insulating material as a filler in order to increase the strength.

The roll-up type capacitor of the present invention has a large cross-section area of the electrode layer at the connection part between the outer electrode and the upper electrode layer or the lower electrode layer. Therefore, the roll-up type capacitor has a lower ESR and a higher capacitance even in a high frequency range. Furthermore, in the roll-up type capacitor of the present invention, a current linearly flows along the central axis of the cylindrical part. Therefore, the roll-up type capacitor of the present invention is more suitable in a high frequency range in comparison with the conventional roll-up type capacitor in which the current spirally flows along the direction of rolling-up.

In one embodiment, the roll-up type capacitor of the present invention comprises a diffusion-preventing layer under the lower electrode layer. By providing the diffusion-preventing layer, a diffusion of a sacrificial layer into the lower electrode layer during a production of the roll-up type capacitor can be prevented.

A material forming the diffusion-preventing layer is not particularly limited, but is preferably a metal oxide such as aluminum oxide ($AlO_x$: for example, $Al_2O_3$), silicon oxide ($SiO_x$: for example, $SiO_2$), Al—Ti complex oxide ($AlTiO_x$), Si—Ti complex oxide ($SiTiO_x$), hafnium oxide ($HfO_x$), tantalum oxide ($TaO_x$), zirconium oxide ($ZrO_x$), Hf—Si complex oxide ($HfSiO_x$), Zr—Si complex oxide ($ZrSiO_x$), Ti—Zr complex oxide ($TiZrO_x$), Ti—Zr—W complex oxide ($TiZrWO_x$), titanium oxide ($TiO_x$), Sr—Ti complex oxide ($SrTiO_x$), Pb—Ti complex oxide ($PbTiO_x$), Ba—Ti complex oxide ($BaTiO_x$), Ba—Sr—Ti complex oxide ($BaSrTiO_x$), Ba—Ca—Ti complex oxide ($BaCaTiO_x$), Si—Al complex oxide ($SiAlO_x$), Sr—Ru complex oxide ($SrRuO_x$), Sr—V complex oxide ($SrVO_x$); metal nitride such as aluminum nitride ($AlN_y$), silicon nitride ($SiN_y$), Al—Sc complex nitride ($AlScN_y$), titanium nitride ($TiN_y$) and the like; or a metal oxynitride such as aluminum oxynitride ($AlO_xN_y$), silicone oxynitride ($SiO_xN_y$), Hf—Si complex oxynitride ($HfSiO_xN_y$), Si—C complex oxynitride ($SiC_zO_xN_y$) and the like, and particularly is preferably $AlO_z$ and $SiO_z$. It is noted that the above formulae are only intended to show a constitution of the atoms and does not limit the composition. In other words, x, y and z which accompany O, N and C, respectively, may be arbitrary values, and a present ratio of the atoms comprising the metal atoms is arbitrary.

A thickness of the diffusion-preventing layer is not particularly limited, but is, for example, preferably 5-30 nm, more preferably 5-10 nm. By regulating the thickness of the diffusion-preventing layer to 5 nm or more, the diffusion of the components constituting the sacrificial layer can be more effectively suppressed. In addition, when the diffusion-preventing layer is formed of an insulating material, the insulation property can be increased, therefore a leakage current can be reduced. By regulating the thickness of the diffusion-preventing layer to 30 nm or less, in particular 10 nm or less, a diameter of the roll can be more reduced, therefore the size can be more reduced. In addition, larger capacitance can be obtained.

A process for forming the diffusion-preventing layer include a vacuum deposition method, a chemical vapor deposition method, a sputtering method, an ALD method, a PLD method, and the like, preferably is the ALD method. The ALD method provides a membrane having very high homogeneity and high density because the ALD method forms the membrane by depositing an atomic layer one by one by a reaction gas containing a raw material constituting the layer. By forming the diffusion-preventing layer on the sacrificial layer by the ALD method, it is possible to efficiently suppress the diffusion of the components constituting the sacrificial layer into another layer, for example, the lower electrode layer. Additionally, since the diffusion-preventing layer formed by the ALD method is very thin and has a high homogeneity and high density, the diffusion-preventing layer can be a membrane which has a low leakage current and high insulation when the diffusion-preventing layer is formed of an insulating material. It is noted that since the membrane formed by the ALD method is mainly amorphous, the composition of the membrane is not limited to a stoichiometry ratio and the membrane may be constructed at various compositional ratios.

When the diffusion-preventing layer is formed of the insulating material, since the diffusion-preventing layer can prevent an electrical contact between the upper electrode layer and the lower electrode layer after rolling-up, the above insulating layer may not be provided.

In one embodiment, an adhering layer may be formed between the diffusion-preventing layer and the lower electrode layer.

The adhering layer has an adhesion to the diffusion-preventing layer and the lower electrode layer, therefore, has a function of preventing the lower electrode layer from pealing in the laminate.

Examples of a material forming the adhering layer include titanium oxide ($TiO_x$) and chromium oxide ($CrO_x$).

A process for forming the adhering layer is not particular limited, and the adhering layer may be directly formed on a layer under the adhering layer or it may be formed by the application of a membrane which is separately formed to the layer under the adhering layer. Examples of the method for directly forming the adhering layer on the layer under the adhering layer include a vacuum deposition method, a chemical vapor deposition method, a sputtering method, an ALD method, a PLD method, and the like.

Figure 3:
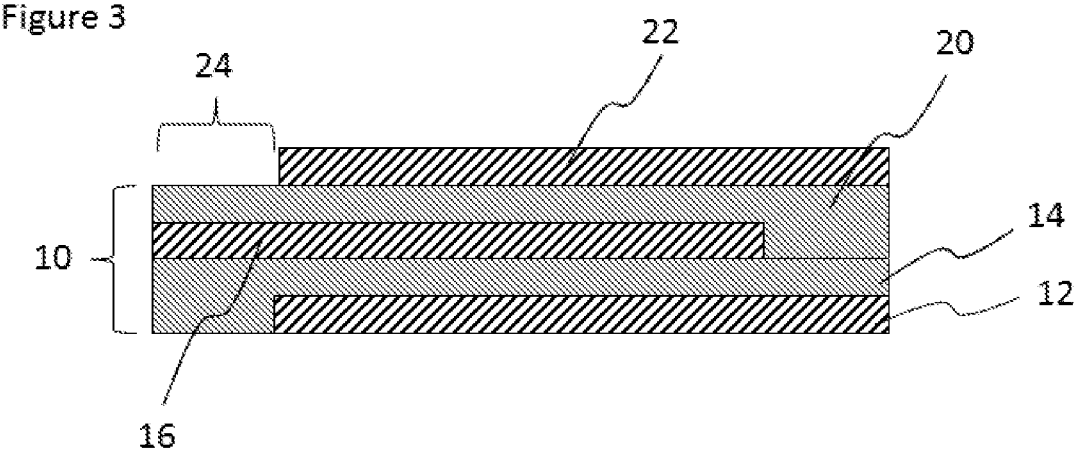
FIG. 3 schematically shows a laminate in another embodiment in its cross-sectional view perpendicular to the direction of the rolling-up.

In other embodiment, the roll-up type capacitor of the present invention comprises a second dielectric layer 20 on the upper electrode layer 16 and further a third electrode layer 22 thereon as shown in FIG. 3. As it is for the lower electrode layer 12, the third electrode layer 22 is provided such that it does not completely overlap the upper electrode layer 16, is electrically connected to the second external electrode 6 and is separated from first external electrode 4. By applying such configuration, all the dielectric layers between the upper electrode layer and the lower electrode layer can contact the upper electrode layer and the lower electrode layer in the substantially whole surface even after rolling-up. The contact of all the dielectric layers between the upper electrode layer and the lower electrode layer with the upper electrode layer and the lower electrode layer in the substantially whole surface can stably provide a higher capacitance.

A material forming the second dielectric layer may be the same as the above described material forming the dielectric layer. A process for forming the second dielectric layer may be the same as the above described process for forming the dielectric layer.

A material forming the third electrode layer may be the same as the above described material forming the lower electrode layer. A process for forming the third electrode layer may be the same as the above described process for forming the lower electrode layer.

In a preferable embodiment, a portion 24 is filled with an insulating material such as a resin. By the presence of the insulating material in the portion 24, the electrical insulation between the third electrode layer 22 and the first external electrode 4 is much ensured. Examples of the method for providing the portion 24 with resin include for example a method of impregnating the cylindrical part with the resin after rolling-up.

In other embodiment, an interfacial layer may be formed between the dielectric layer and the upper electrode layer and/or between the dielectric layer and the lower electrode layer.

The interfacial layer has a function of suppressing a leakage current caused by a Schottky junction.

As a material forming the interfacial layer, a suitable metal is appropriately used depending on the material of the dielectric layer.

A process for forming the interfacial layer is not particular limited, and the interfacial layer may be directly formed on a layer under the interfacial layer or it may be formed by the application of a membrane which is separately formed to the layer under the interfacial layer. Examples of the method for directly forming the interfacial layer on the layer under the adhering layer include a vacuum deposition method, a chemical vapor deposition method, a sputtering method, an ALD method, a PLD method, and the like.

The roll-up type capacitor of the present invention is not limited to the above embodiment, and can be variously modified as long as it can exert a function as a capacitor. For example, the roll-up type capacitor of the present invention may comprise multiple same layers or further layers.

The capacitor of the present invention can be generally produced by a process which comprises forming a sacrificial layer on a substrate; forming a lower electrode layer, a dielectric layer and an upper electrode layer on the sacrificial layer in this order to obtain a laminate; rolling-up the laminate by removing the sacrificial layer to obtain a cylindrical part; and forming a first external electrode on one side of the obtained cylindrical part such that the first external electrode is electrically connected to the upper electrode layer, and forming a second external electrode on the other side such that the second external electrode is electrically connected to the lower electrode layer. In more detail, it is produced as follows.

Firstly, a substrate is provided.

A material forming the substrate is not particularly limited, but preferable to be a material which has no adverse effect on the formation of the sacrificial layer and is stable against an etching solution for removing the sacrificial layer. Examples of such material include silicon, silica, magnesia, and the like.

Next, the sacrificial layer is formed on the substrate.

A material forming the sacrificial layer is not particularly limited as long as it is a material which is able to be removed, for example by an etching treatment after the formation of the laminate, but is preferably germanium oxide because it is relatively stable under a high temperature.

A thickness of the sacrificial layer is not particularly limited, but is for example 5-100 nm, preferably 10-30 nm.

A process for forming the sacrificial layer is not particular limited, and the sacrificial layer may be directly formed on the substrate or it may be formed by the application of a membrane which is separately formed to the substrate. Examples of the method for directly forming the sacrificial layer on the substrate include, for example, a vacuum deposition method, a chemical vapor deposition method, a sputtering method, a PLD method, and the like.

Alternatively, a precursor layer may be formed on the substrate and treated to obtain the sacrificial layer. For example, a metal layer may be formed on the substrate and oxidized to obtain the sacrificial layer.

Next, the lower electrode layer, the dielectric layer and the upper electrode layer are formed on the sacrificial layer by the above described method to obtain the laminate. It is noted that the number of the laminate formed on the substrate is not necessarily one, and a plurality of the laminates may be formed on one substrate. When the roll-up type capacitor comprises other layers, for example, the diffusion-preventing layer, the second dielectric layer, the third electrode layer and the like, these layers may be formed at a prescribed position to obtain the laminate.

Figure 2:
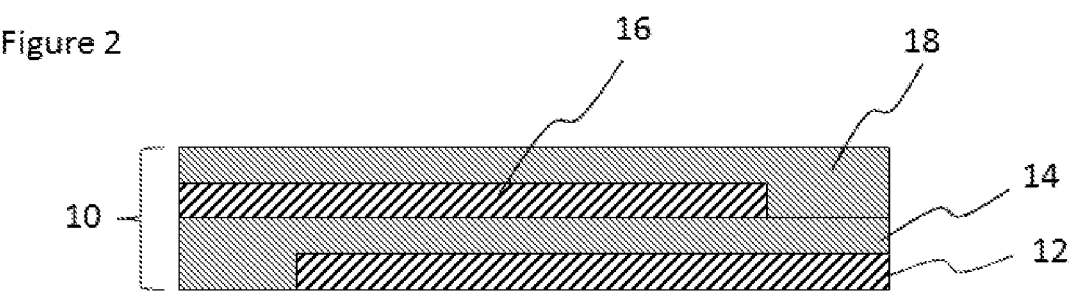
FIG. 2 schematically shows the laminate constituting the cylindrical part of the roll-up type capacitor shown in FIG. 1 in its cross-sectional view perpendicular to the direction of the rolling-up.

In the above laminate, the lower electrode layer and the upper electrode layer are formed such that one end of one electrode layer does not completely overlap the other electrode layer as shown in FIG. 2. The laminate having such structure can be produced, for example, by using a photo-lithographic technique.

The laminate has an internal stress in the direction from the lower electrode layer to the upper electrode layer. Such internal stress can be caused by the provision of a tensile stress to a lower layer of the laminate, for example the lower electrode layer and/or by the provision of a compressive stress to an upper layer of the laminate, for example, the upper electrode layer. Preferably, the laminate is formed so that the lower electrode layer has the tensile stress and the upper electrode layer has the compressive stress. Those skilled in the art can appropriately select a material and a formation method of the layer to provide the tensile stress or the compressive stress.

By having the internal stress in the direction from the lower electrode layer to the upper electrode layer, the laminate can bend and self-roll-up due to the stress when it is released from the substrate.

Next, the laminate obtained as mentioned above is rolled-up by the removal of the sacrificial layer.

A process for removal of the sacrificial layer is not particular limited, but is preferably an etching method which etches the sacrificial layer with an etching solution. For example, the sacrificial layer or the substrate is exposed at the starting position of rolling-up of the laminate by etching, and the etching solution is fed to etch and remove the sacrificial layer.

The etching solution can be appropriately selected depending on the materials forming the sacrificial layer as well as the constituent layers of the laminate. For example, when the sacrificial layer is formed of $GeO_2$, hydrogen peroxide aqueous solution is preferably used.

The sacrificial layer is gradually removed from one side of the laminate. The laminate separates from the substrate gradually from the part in which the sacrificial layer is removed, and bends and rolls due to the internal stress to form the cylindrical part. The number of turns in the cylindrical part is not particular limited and may be one or several. The number of turns can be selected depending on the size (diameter) and the planar area to be compacted into the roll-up type capacitor.

Next, the first external electrode and the second external electrode are formed on the both ends of the resultant cylindrical part by the above described method, for example, plating.

In this way, the roll-up type capacitor of the present invention can be produced.

In a preferable embodiment, after rolling-up the laminate, a resin may be fed into the substrate, and the cylindrical parts on the substrate may be immersed in the resin. Preferably, the immersion is performed for sufficient time to penetrate the resin into the inside the cylindrical part.

Next, the resin is cured and cut out into a desired shape, for example a rectangular parallelepiped shape, and then the upper electrode layer and the lower electrode layer are exposed from surfaces corresponding to both ends of the cylindrical part by grinding. Then, the first external electrode and the second external electrode are formed on the exposed surfaces of the upper electrode layer and the lower electrode layer, respectively to produce the roll-up type capacitor of the present invention wherein the cylindrical part is hardened with the resin.

EXAMPLES

Example 1

Formation of the Sacrificial Layer Pattern

Figure 4A:
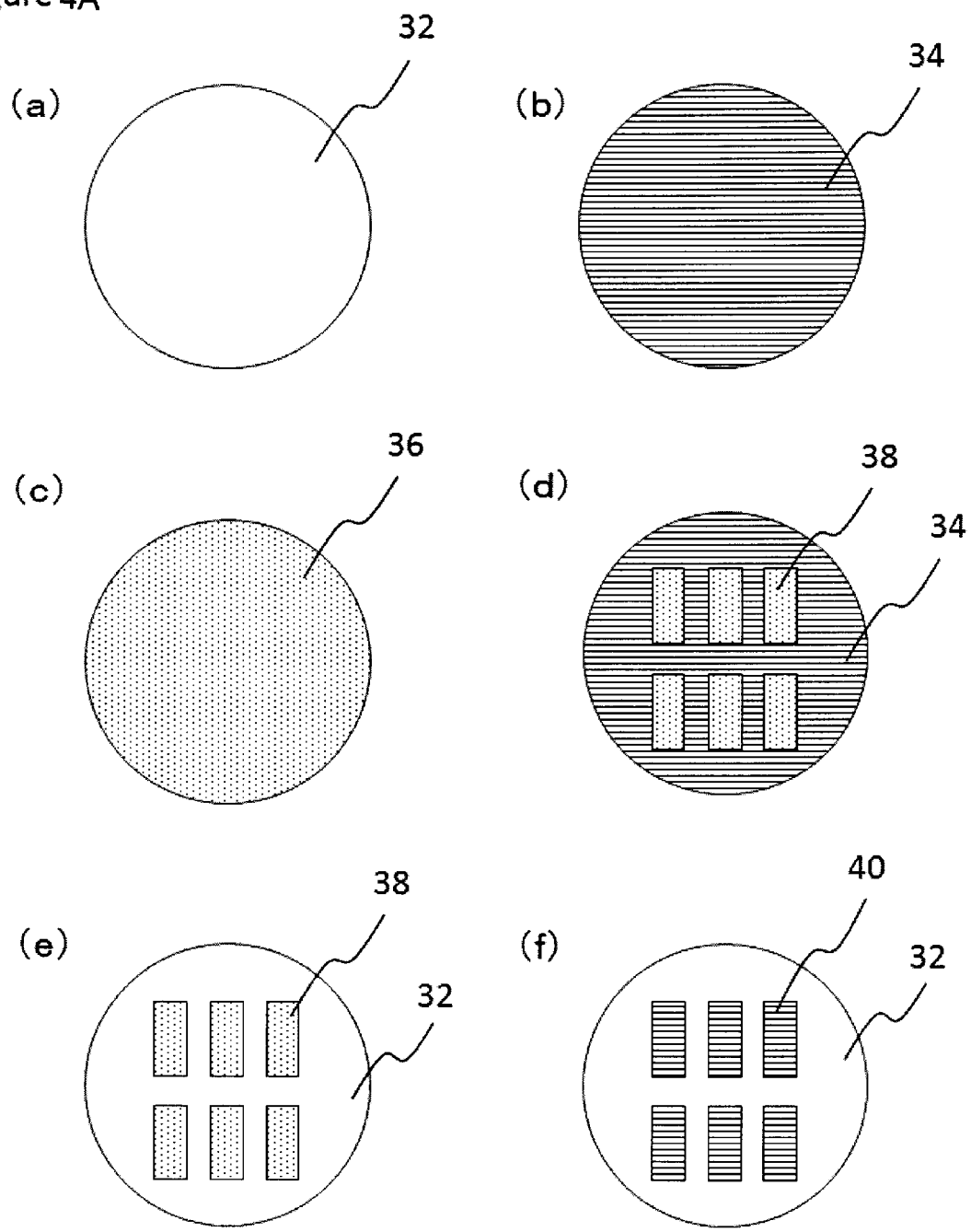
FIGS. 4A to 4C schematically show a process for producing the roll-up type capacitor of Example 1.

A silicon substrate 32 having a diameter of 4 inches was provided (FIG. 4A(a)), and a Ge layer having the thickness of 20 nm was formed by a vacuum deposition method on whole surface of the substrate. The obtained Ge layer was oxidized under the atmosphere of $N_2/O_2$ at a temperature of 150° C. to form a sacrificial layer 34 (FIG. 4A(b)) of $GeO_2$. A positive photoresist 36 was applied on the whole surface thereof (FIG. 4A(c)). Then, a light-exposure via a mask having a prescribed pattern and a development were conducted to remove the uncured photoresist, as a result of which, a plurality of the cured photoresist 38 having a strip shape was formed on the sacrificial layer (FIG. 4A(d)). The resultant substrate was immersed in an etching solution containing hydrogen peroxide to remove the sacrificial layer in the area where the cured photoresist is absent (FIG. 4A(e)). The cured photoresist was removed with an organic solvent to form the sacrificial layer pattern 40 having a strip shape (width: 500 μm, length: 1 mm) (FIG. 4A(f)).

Formation of the Lower Electrode Layer Pattern

Figure 4B:
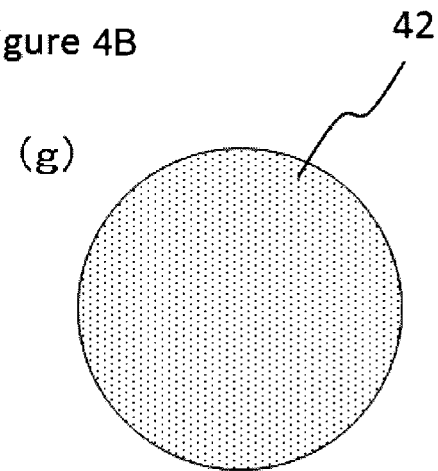
Figure 4B:
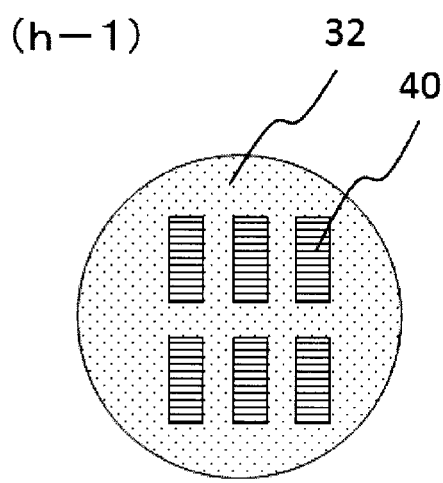
Figure 4B:
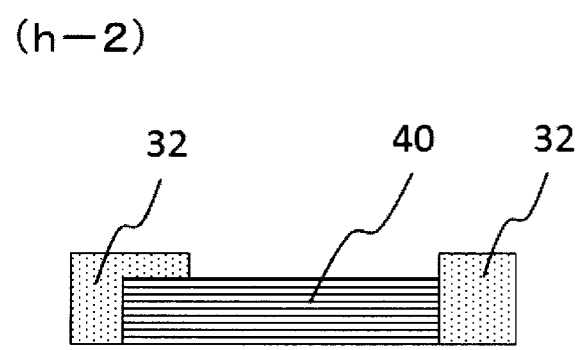
Figure 4B:
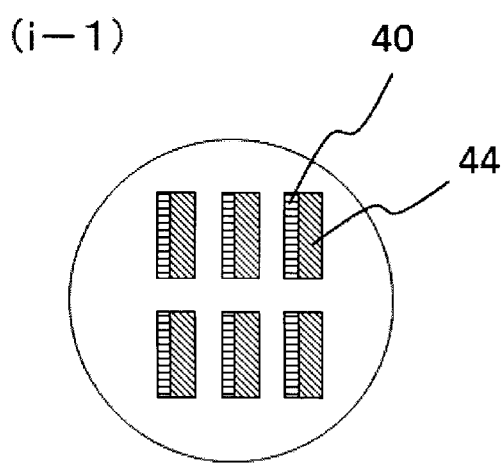
Figure 4B:
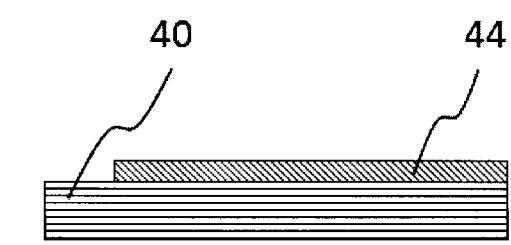

A negative photoresist 42 was applied to the whole surface of the substrate obtained above (FIG. 4B(g)), and then a light-exposure via a mask having a prescribed pattern and a development were conducted to remove the cured photoresist to expose the sacrificial layer (FIG. 4B(h-1)). At this time, the photoresist was left over an area of 50 μm from one end of the sacrificial layer pattern (FIG. 4B(h-2)). An Au layer and a Pt layer having the thickness of 15 nm (total 30 nm) as the lower electrode layer were formed by a vapor deposition method. Then, the photoresist shown in FIGS. 4B(h-1) and (h-2) was removed together with the Pt layer present thereon to form a lower electrode layer pattern 44 on the sacrificial layer (FIGS. 4B(i-1) and (i-2)).

Formation of the Dielectric Layer

An $Al_2O_3$ layer having the thickness of 15 nm as the dielectric layer 46 was formed on the whole surface of the substrate by an ALD method (the substrate temperature: 250° C.)

Formation of the Upper Electrode Layer Pattern

Figure 4C:
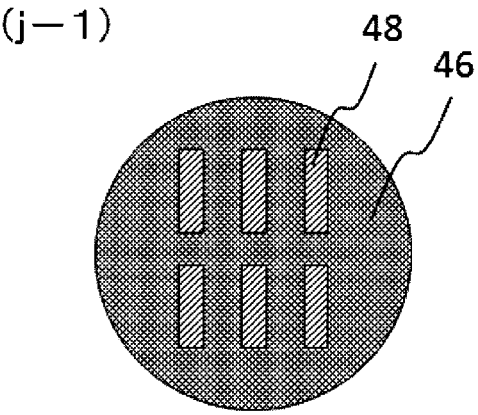
Figure 4C:
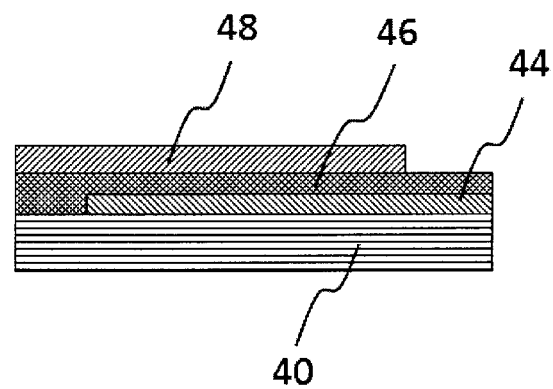
Figure 4C:
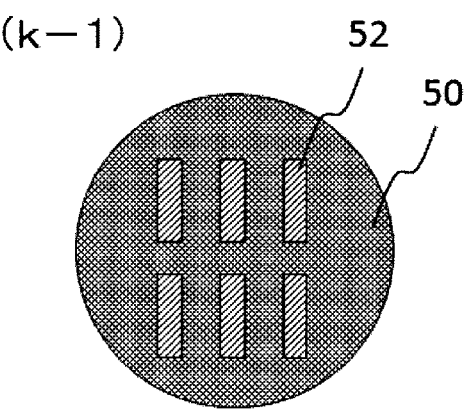
Figure 4C:
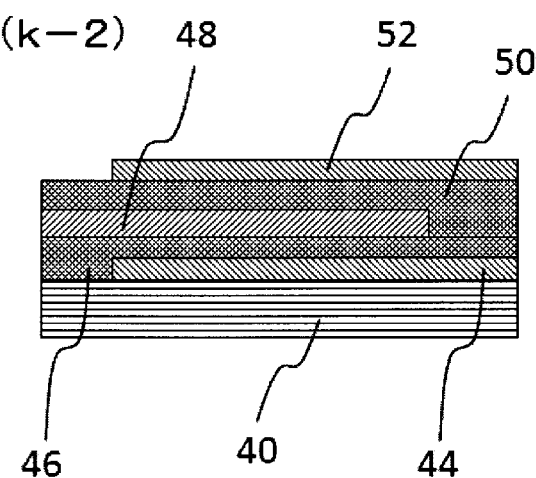
Figure 4C:
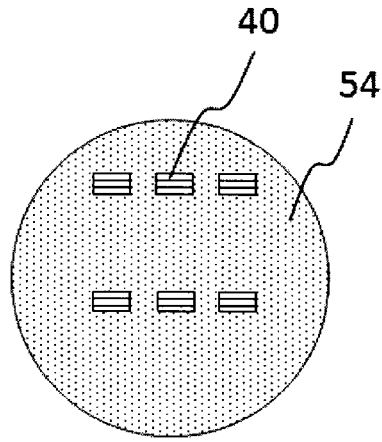
Figure 4C:
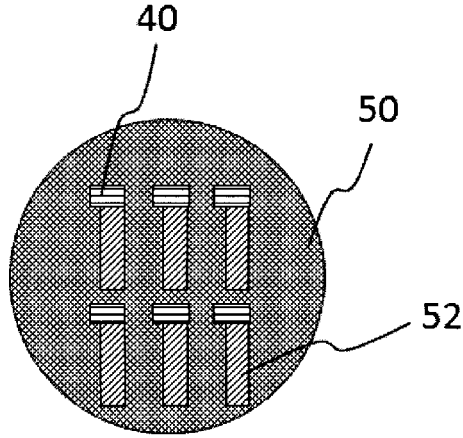

As it is for the lower electrode layer, a pattern of the photoresist was formed on the whole surface of the substrate; a Cr layer having the thickness of 20 nm as the upper electrode layer was formed by a vapor deposition; the photoresist was removed together with the Cr layer thereon to form an upper electrode layer pattern 48 on the dielectric layer. At this time, the upper electrode layer was not provided to an area of 50 μm from one long side where the lower electrode layer is present (FIGS. 4C(j-1) and (j-2)).

Formation of the Second Dielectric Layer

An Al$_2$O$_3$ layer having the thickness of 15 nm as the second dielectric layer 50 was formed on the whole surface of the substrate by an ALD method.

Formation of the Third Electrode Layer

As it is for the other electrode layers, a pattern of the photoresist was formed on the whole surface of the substrate; a Cr layer having the thickness of 10 nm as the third electrode layer was formed by a vapor deposition; the photoresist was removed together with the Cr layer thereon to form an third electrode layer pattern 52 on the dielectric layer. At this time, as it is for the lower electrode layer, the third electrode layer was not provided to an area of 50 μm from one long side (FIGS. 4C(k-1) and (k-2)).

As described above, the rectangular laminate (width; 500 μm, length: 1 mm) was formed on the substrate.

Formation of the Cylindrical Part (A Rolling-Up Step)

A photoresist 54 was applied to the whole surface of the substrate obtained above having the laminates, patterning was conducted, and the photoresist on one short side of the laminate was removed. Then, the section where the photoresist was removed (the exposed section of the second dielectric layer) was etched by using a hydrofluoric acid aqueous solution to expose the sacrificial layer 40 (FIG. 4C(1)). Then, the photoresist was removed (FIG. 4C(m)), the hydrogen peroxide aqueous solution was fed into the exposed sacrificial layer to gradually etch the sacrificial layer from one short side of the laminate. As the sacrificial layer was etched, the laminate rolled-up to produce the cylindrical parts (a capacitor element) having an outer diameter of 50 μm, an inner diameter of 15 μm, and a length of 500 μm on the substrate.

Formation of the Resin Part (A Step of Hardening with Resin)

A dam was provided on the outer edge of the substrate obtained above, and an epoxy resin was fed thereinto to immerse the capacitor elements. Then, air in the resin was removed by a heating under vacuum, and the capacitor elements was impregnated with the resin for 15 minutes. The resin was thermal cured by storing in an oven at 150° C. for a whole day and night. The cured resin was rapidly cooled together with the substrate to near room temperature. Due to the stress difference between the substrate and the resin which was generated by cooling, the resin containing the capacitor elements was separated from the substrate. A resin was applied to the exfoliated area and was thermal-cured to completely cover the capacitor elements.

Formation of the Outer Electrode

The resin containing the capacitor elements obtained above was cut into each unit containing one capacitor element with a dicer. Then, the resin parts at both sides of the capacitor element were grinded to expose the electrode layers. These exposed surfaces were electrolytic plated with Ni to form outer electrodes having the thickness of 50 μm, thereby obtaining the roll-up type capacitor of Example 1.

Measurement of a Capacitance and an Impedance

Figure 5:
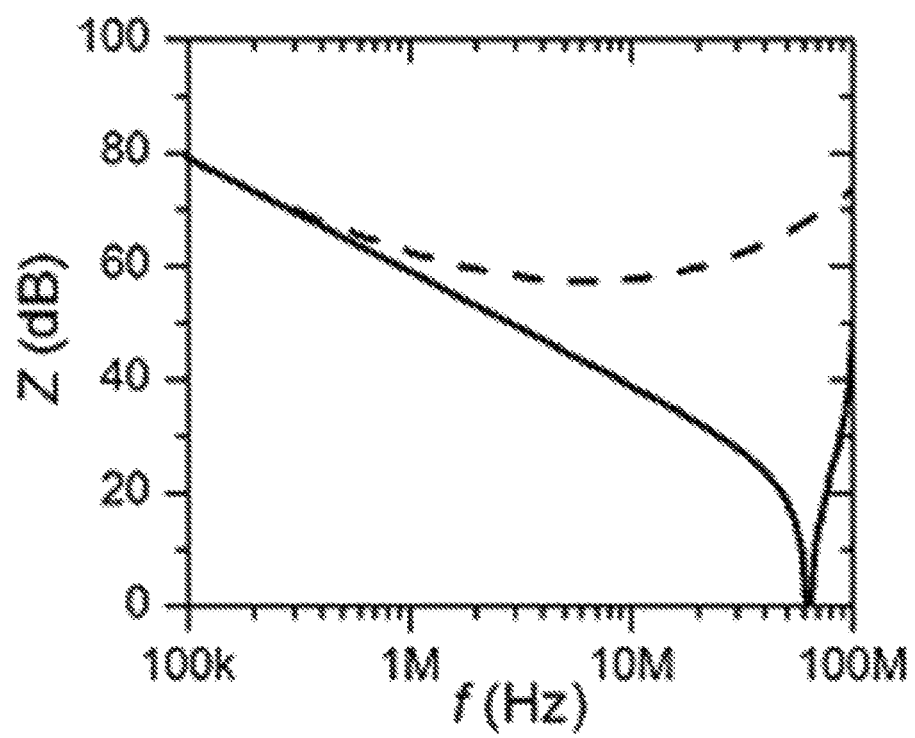
FIG. 5 schematically shows the results of the measurement of the impedance frequency characteristic for the roll-up type capacitors of Example 1 and Comparative Example 1.

An alternating voltage (1 kHz to 10 MHz, 0.1 Vrms) was applied to the roll-up type capacitor of Example 1 and a capacitance was measured. In the result, the capacitance was 9 nF in all frequency range. Additionally, an impedance frequency characteristic was measured in the range of 100 kHz to 100 MHz. The result is shown in FIG. 5 with a solid line. The resonant frequency was 63 MHz.

Comparative Example 1

Producing the Capacitor

A capacitor element of Comparative Example 1 was produced in the same way as in Example 1, except extraction electrodes from the lower electrode layer and the third electrode layer as well as an extraction electrode from the upper electrode layer were formed on the side opposite to the side where the rolling-up of the laminate was started by patterning.

Measurement of a Capacitance and an Impedance

The capacitance was measured in the same way as in Example 1. In the result, the capacitance was decreased in the frequency range of 100 kHz or more. The impedance frequency characteristic was measured in the same way as in Example 1. The result is shown in FIG. 5 with a dashed line. For the sample of Comparative Example 1, the impedance did not become low due to the influence of the resistance between the electrode terminal and the electrically conductive layer in comparison with the sample of Example 1.

From these results, it was confirmed that the roll-up type capacitor wherein the outer electrode was provided on the both side of the capacitor element has an excellent capacitance. In addition, it was confirmed that such roll-up type capacitor can be used in a high frequency range.

The capacitor of the present invention can be used in various electrical apparatuses since it is a small size and has large capacitance.

EXPLANATION OF THE REFERENCE NUMERALS 1, capacitor; 2, cylindrical part;
4, first external electrode;
6, second external electrode; 8, resin part;
10, laminate; 12, lower electrode layer;
14, dielectric layer; 16, upper electrode layer;
18, insulating layer; 20, second dielectric layer;
22, third electrode layer; 24, portion;
32, silicon substrate; 34, sacrificial layer;
36, photoresist; 38, photoresist;
40, sacrificial layer pattern; 42, photoresist;
44, lower electrode layer pattern; 46, dielectric layer;
48, upper electrode layer pattern;
50, second dielectric layer;
52, third electrode layer pattern; 54, photoresist

The invention claimed is:

1. A process for producing a roll-up type capacitor, the process comprising: forming a sacrificial layer on a substrate;

forming a diffusion-preventing layer using an atomic layer deposition method;

after the formation of the diffusion-prevention layer, forming a first electrode layer, a dielectric layer and a second electrode layer on the sacrificial layer in this order to obtain a laminate;

removing the sacrificial layer and rolling up the laminate to obtain a cylindrical part having a central axis and opposed first and second lateral ends;

forming first and second planar electrodes on the first and second lateral ends of the cylindrical part such that the first planar electrode is electrically connected to the first electrode layer, the second planar electrode is electrically connected to the second electrode layer, and the first and second planar electrodes do not extend into the cylindrical part.

2. The process according to claim 1, which further comprising forming an adhering layer between the diffusion-preventing layer and the first electrode layer.

3. The process according to claim 1, further comprising forming an interfacial layer between the dielectric layer and the second electrode layer.

4. The process according to claim 1, further comprising forming an interfacial layer between the dielectric layer and the first electrode layer.

5. The process according to claim 1, wherein the dielectric layer is a first dielectric layer, and the process further comprises forming a second dielectric layer on the second electrode layer, and forming a third electrode layer on the second dielectric layer.

* * * * *